US006915638B2

(12) United States Patent
Runkle et al.

(10) Patent No.: US 6,915,638 B2
(45) Date of Patent: Jul. 12, 2005

(54) NOZZLE WITH FLUTED TUBE

(75) Inventors: Bryan T. Runkle, Walworth, NY (US); Jie Qian, Palmyra, NY (US); Curtis F. Harding, Lyons, NY (US)

(73) Assignee: Parker-Hannifin Corporation, Cleveland, OH (US)

( * ) Notice: Subject to any disclaimer, the term of this patent is extended or adjusted under 35 U.S.C. 154(b) by 36 days.

(21) Appl. No.: 10/388,797

(22) Filed: Mar. 13, 2003

(65) Prior Publication Data

US 2003/0182945 A1 Oct. 2, 2003

Related U.S. Application Data

(60) Provisional application No. 60/368,620, filed on Mar. 28, 2002.

(51) Int. Cl.[7] ................................................. F02C 7/22
(52) U.S. Cl. ........................................ 60/740; 239/424
(58) Field of Search .................... 60/740–742; 239/132, 239/132.1, 132.3, 424–424.5, 425

(56) References Cited

U.S. PATENT DOCUMENTS

| 3,841,565 | A |  | 10/1974 | Buisson et al. |
| 4,229,944 | A |  | 10/1980 | Weiler |
| 4,258,544 | A |  | 3/1981 | Gebhart et al. |
| 4,305,255 | A |  | 12/1981 | Davies et al. |
| 4,621,492 | A | * | 11/1986 | von Pragenau .......... 239/132.5 |
| 4,735,044 | A |  | 4/1988 | Richey et al. |
| 5,570,580 | A |  | 11/1996 | Mains |
| 6,358,041 | B1 | * | 3/2002 | Whittaker et al. ....... 239/132.3 |

OTHER PUBLICATIONS

Translation of French reference 1,380,744 dated Oct. 26, 1964.

* cited by examiner

*Primary Examiner*—Louis J. Casaregola
(74) *Attorney, Agent, or Firm*—Christopher H. Hunter

(57) ABSTRACT

A fuel injector for gas turbine engines includes an inlet fitting, a housing stem, and a spray nozzle. A pair of fuel passages in the stem deliver fuel in a primary (continuous) flow and a secondary (non-continuous or reduced) flow to primary and secondary discharge orifices in the nozzle. The fuel passages are defined by inner and outer concentric conduits, with the primary flow directed through the inner conduit, and the secondary flow directed through the outer conduit. Fins are provided unitary with the inner conduit along the length of the housing stem, and are fixed at their radial outer ends to the outer conduit. The fins provide structural support and thermally connect the inner and outer conduits. During low power operation, the fins transfer heat energy between the outer conduit to the inner conduit to cool the outer conduit and thermally protect the fuel in the secondary fuel passage.

15 Claims, 3 Drawing Sheets

NOZZLE WITH FLUTED TUBE

CROSS-REFERENCE TO RELATED CASES

The present application claims the benefit of the filing date of U.S. Provisional Application Ser. No. 60/368,620; filed Mar. 28, 2002, the disclosure of which is expressly incorporated herein by reference.

FIELD OF THE INVENTION

The present invention relates to fluid delivery systems, and more particularly to injectors useful for dispensing liquid fuel for combustion in gas turbine engines.

BACKGROUND OF THE INVENTION

Fuel injectors useful for applications such as gas turbine combustion engines direct pressurized fuel from a manifold to one or more combustion chambers. Fuel injectors also function to prepare the fuel for mixing with air prior to combustion. Each injector typically includes an inlet fitting connected to the manifold, a tubular stem or extension connected at one end to the fitting, and one or more spray nozzles connected to the other end of the stem for directing the fuel into the combustion chamber. A fuel passage (e.g., a tube, conduit or bore) extends through the stem to supply the fuel from the inlet fitting to the nozzle. Appropriate valves and/or flow dividers can be provided to direct and control the flow of fuel through the nozzle.

The fuel injectors are often placed in an evenly-spaced annular arrangement to dispense (spray) fuel in a uniform manner into the combustor chamber. Additional concentric and/or series combustion chambers each require their own arrangements of nozzles that can be supported separately or on common stems. The fuel provided by the injectors is mixed with air and ignited, so that the expanding gases of combustion can, for example, move rapidly across and rotate turbine blades in a gas turbine engine to power an aircraft, or in other appropriate manners in other combustion applications.

Because of limited fuel pressure availability and a wide range of required fuel flow, many fuel injectors include primary and secondary fuel flows to primary and secondary discharge orifices in each nozzle, with both the primary and secondary fuel flows being used during higher power operation (e.g., during cruise and take-off), and only the primary fuel flow being used during lower power operation (e.g., during idle descent). The secondary flow is significantly reduced or substantially or completely suspended during the lower power operation. Such injectors can be more efficient and cleaner-burning than single flow fuel injectors, as the fuel flow can be more accurately controlled and the fuel spray more accurately directed for the particular combustor requirement.

The primary and secondary flows in these types of injectors can be directed through primary and secondary passages supported in adjacent relation to one another, as in U.S. Pat. No. 4,735,044; or located in concentric relation to one another, as in U.S. Pat. No. 5,413,178. The concentric arrangement generally results in a more compact nozzle. In U.S. Pat. No. 5,413,178, for example, which is owned by the assignee of the present application, the fuel travels in concentric conduits where the primary flow from a pilot nozzle is routed through a cooling circuit down and back in surrounding relation to the primary and secondary flows for a main nozzle; and then down in surrounding relation to the secondary flow for the pilot nozzle. The secondary discharge orifice for both the pilot and main nozzles has an annular configuration and outwardly surrounds respective central primary discharge orifices. The primary flow from the pilot nozzle is constantly flowing during engine operation, and provides a sheath of cooling fluid for the fuel passages in the nozzle stem. Radial fins are provided between the inner fuel conduits for the secondary flows and the outer conduit defining the cooling circuit for the respective flow, for structural support and thermal management.

A fuel injector typically includes one or more heat shields surrounding the portion of the stem and nozzle exposed to the heat of the combustion chamber. The heat shield(s) are necessary because of the high temperature within the combustion chamber during operation and after shut-down, and to prevent the fuel from breaking down into solid deposits (i.e., "coking") which occurs when the wetted walls in a fuel passage exceed a maximum temperature (approximately 400° F. (200° C.) for typical jet fuel). The deposits can build up and restrict fuel flow through the fuel passage and the fuel nozzle, rendering the injector inefficient or unusable.

As is known, the heat shield assemblies can take up valuable space in and around the combustion chamber, block air flow to the combustor, and add weight to the engine. They can also be labor-intensive, time-consuming and expensive to assemble and repair. Large, bulky heatshields can be undesirable with current industry demands requiring reduced cost, smaller injector size ("envelope") and reduced weight for more efficient operation. In addition, certain applications require the secondary fuel conduit to surround the primary fuel conduit. In these applications, the cooling effect of a constant and significant fuel flow around the nozzle stem is absent (particularly during idle descent), and even more extensive heatshielding is necessary to avoid coking. U.S. Pat. No. 4,735,044, for example, suggests i) spacer wires between the outer, secondary conduit, and the outer heat shield; ii) "floating" the fuel tubes with respect to one another and to the heat shield so that there is no contact along their length; and iii) directing excess fluid between the secondary fuel conduit and the outer heat shield. As can be appreciated, such efforts add still further cost and complexity to the fuel injector.

Thus, it is a continuing challenge to develop fuel injectors to properly deliver fuel to a combustion chamber for operation of the gas turbine engine, where the injectors do not require bulky heatshielding and prevent, or at least reduce, coking in the injector during all aspects of engine operation. In applications where a secondary (non-continuous or reduced) fuel flow surrounds a primary (continuous) fuel flow, it is believed that the need for such injectors is even more pronounced.

SUMMARY OF THE PRESENT INVENTION

The present invention provides a new and unique fuel injector, particularly for gas turbine applications in aircraft engines, where the fuel injector delivers fuel to a combustion chamber for operation of the gas turbine engine, and does not require bulky heatshielding and prevents, or at least reduces, coking in the injector. The present invention is particularly useful for applications where a secondary (non-continuous or reduced) fuel flow surrounds a primary (continuous) fuel flow through the injector.

According to the principles of the present invention, the fuel injector includes an inlet fitting connected to the manifold, a tubular housing stem connected at one end to the fitting, and one or more spray nozzles connected to the other end of the stem for directing the fuel into the combustion chamber. A pair of fuel passages are provided internally of the stem between the fitting and the spray nozzles to deliver fuel in a primary (continuous) flow and a secondary (non-continuous or reduced) flow to primary and secondary discharge orifices at the discharge end of the nozzle. The fuel passages are defined by inner and outer concentric conduits, with the primary fuel flow directed through the inner fuel conduit, and the secondary fuel flow directed through the outer conduit, that is, in the annular space between the inner conduit and the outer conduit.

A plurality of fins are provided integral, and preferably unitary, with the inner fuel conduit along the length of the conduit. The fins project radially outward from the inner fuel conduit, and are fixed at their radial outer ends to the outer fuel conduit. The fins are arranged in an even, spaced-apart manner and create flutes, or discrete rounded passages, for the fuel in the outer conduit. The fins provide structural support and thermally connect the inner and outer fuel conduits. During low power operation, when the flow is primarily or solely in the inner conduit (that is, when the flow is significantly reduced or substantially or completely suspended in the outer conduit), the fins transfer and conduct heat energy between the outer conduit and the inner conduit to cool the outer conduit and thereby thermally protect the fuel in the secondary fuel passage from coking.

The inner fuel conduit, with fins, fits closely in the outer conduit during assembly. The outer and/or inner conduits are formed (e.g., ballized, swaged or rolled) to create an appropriate braze gap between the fins and the outer conduit, and the fins are then brazed to the outer conduit to create a rigid connection.

The fuel injectors can be placed in an evenly-spaced annular arrangement to dispense (spray) fuel in a uniform manner into the combustor chamber. Additional concentric and/or series combustion chambers can be provided with nozzles that can be supported separately or on common stems. The fuel provided by the injectors is mixed with air and ignited, so that the expanding gases of combustion can move rapidly across and rotate turbine blades in a gas turbine engine to power an aircraft, or in other appropriate manners in other combustion applications.

Thus, the present invention provides a new and unique fuel injector, particularly for gas turbine applications in aircraft engines, which does not require bulky heatshielding and prevents, or at least reduces, coking in the injector. The present invention is particularly useful for applications where a secondary (non-continuous or reduced) fuel flow surrounds a primary (continuous) fuel flow through the injector.

Other features and advantages of the present invention will become further apparent upon reviewing the following specification and attached drawings.

DETAILED DESCRIPTION OF THE PREFERRED EMBODIMENT

Figure 1:
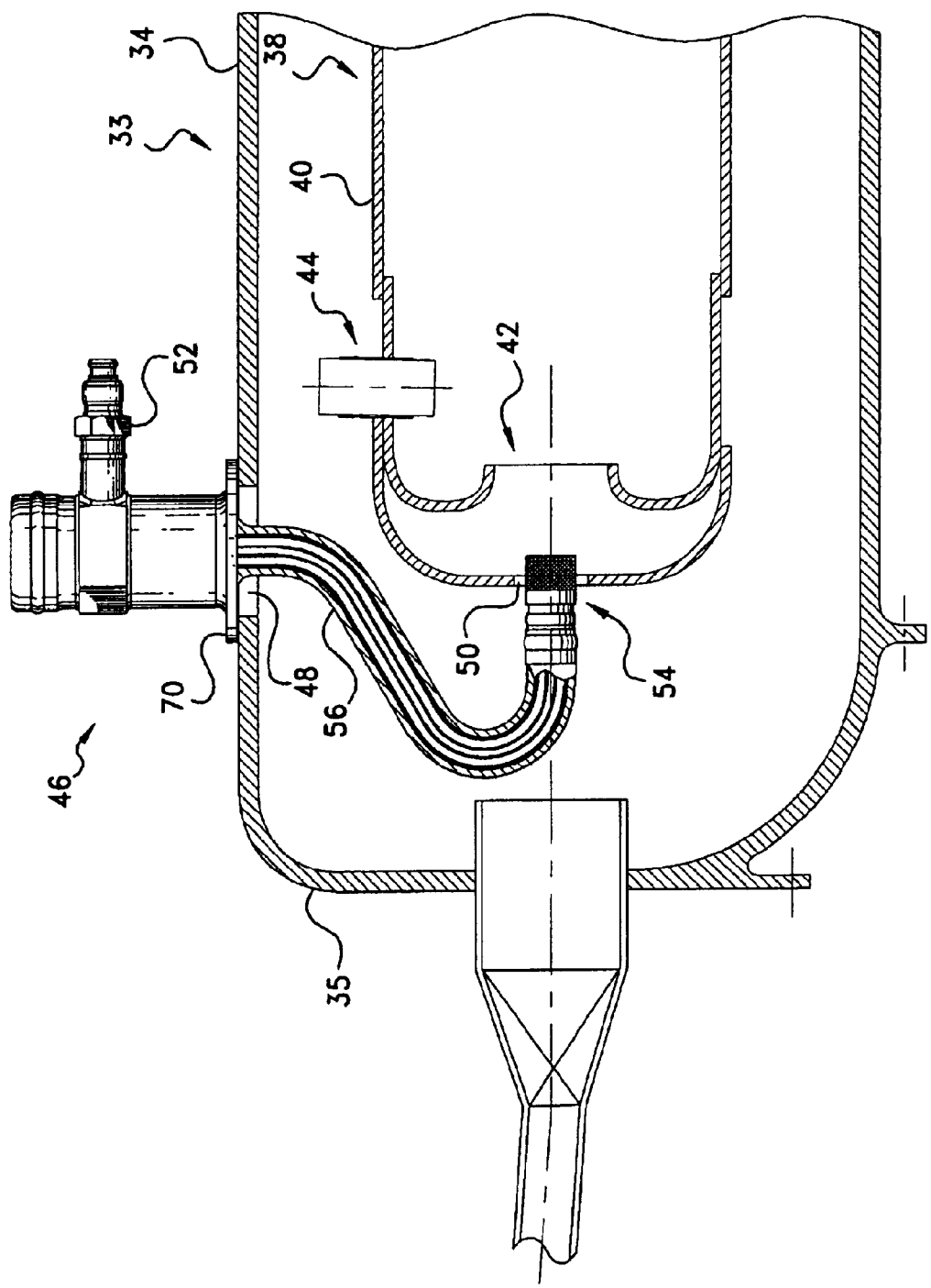
FIG. 1 is a perspective view of a portion of a gas turbine engine illustrating a fuel injector, shown in partial cross-section, constructed according to the principles of the present invention.

Referring initially to FIG. 1, a gas turbine engine for an aircraft is illustrated generally at 33. The gas turbine engine 33 includes an outer casing 34 extending forwardly of an air diffuser 35. The casing and diffuser enclose a combustor, indicated generally at 38, for containment of burning fuel. The combustor 38 includes a liner 40 and a combustor dome, indicated generally at 42. An igniter, indicated generally at 44, is mounted to the combustor 38 and extends inwardly into the combustor for igniting fuel. The above components are conventional in the art and their manufacture and fabrication are well known. It should be appreciated that this is only a schematic illustration of a gas turbine engine for the present invention, and that the actual engine structure depends upon the particular application.

A fuel injector, indicated generally at 46, is received within an aperture 48 formed in the engine casing and extends inwardly through an aperture 50 in the combustor liner. Fuel injector 46 includes a fitting 52 disposed exterior of the engine casing for receiving fuel; a fuel nozzle, indicated generally at 54, disposed within the combustor for dispensing fuel; and a housing stem 56 interconnecting and structurally supporting nozzle 54 with respect to fitting 52. Housing stem 56 has a thickness sufficient to support nozzle 54 in the combustor when the injector is mounted to the engine, and is formed of material appropriate for the particular application (e.g., HAST-X), such that the stem 56 provides a certain amount of heatshielding for the injector.

Figure 2:
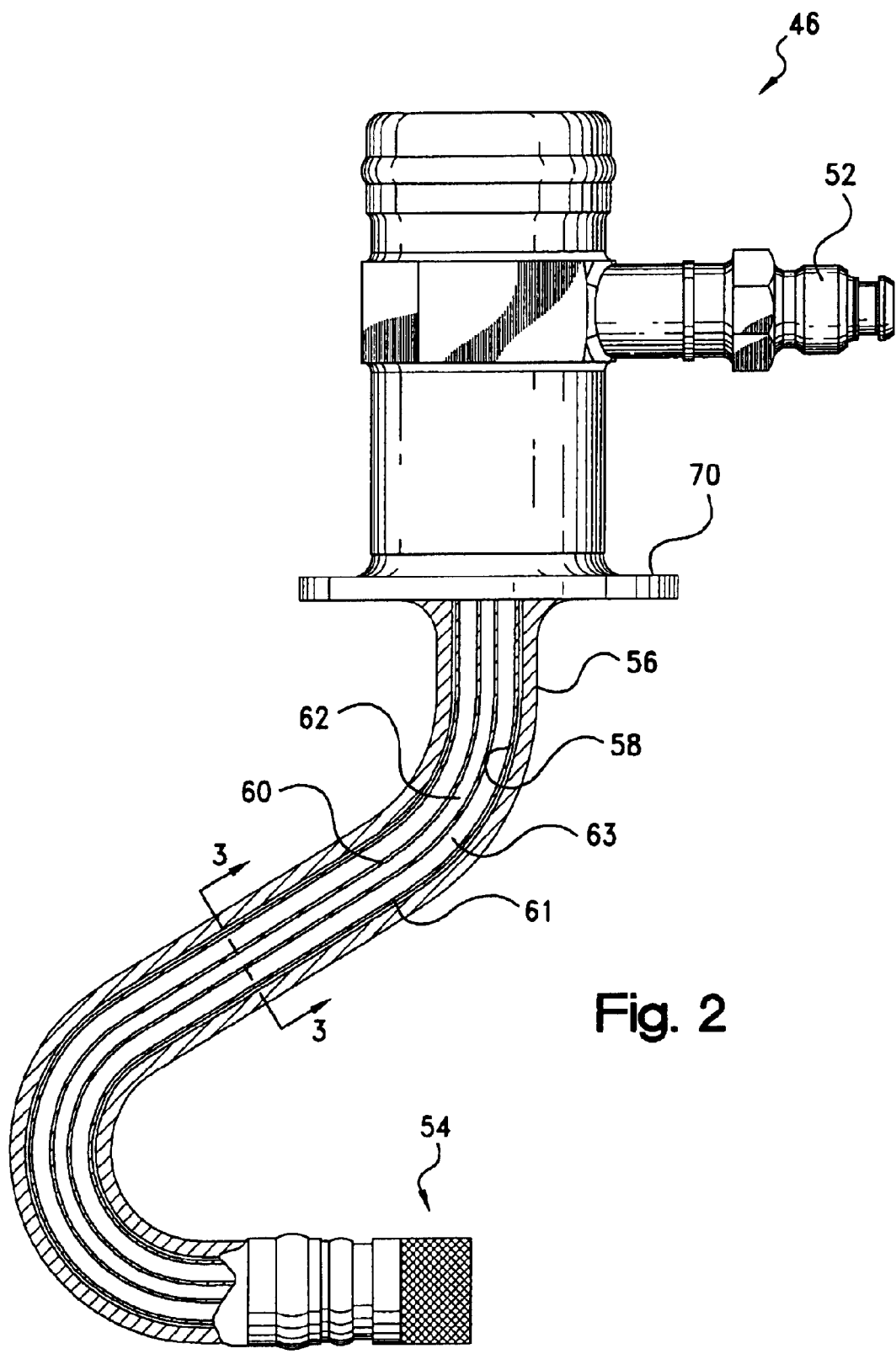
FIG. 2 is an enlarged view of the fuel injector shown in FIG. 1.
Figure 3:
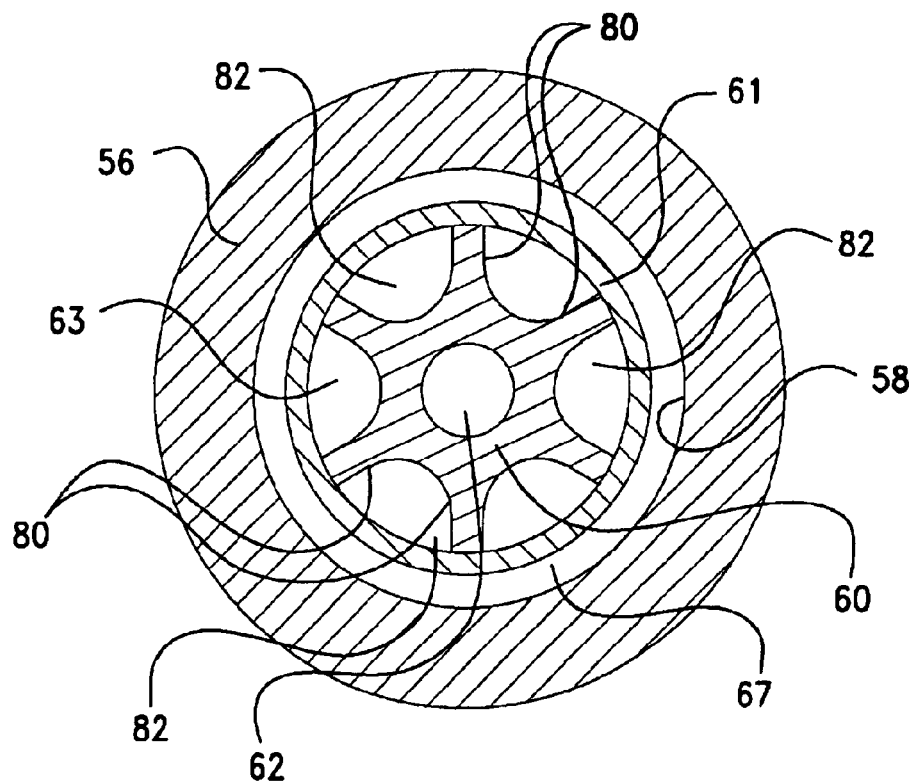
FIG. 3 is a cross-sectional end view of the fuel injector, taken substantially along the plane described by the lines 3—3 in FIG. 2.

Referring now to FIGS. 2 and 3, housing stem 56 includes a central bore 58 extending longitudinally through the length of the stem. Primary and secondary tubular fuel conduits 60, 61 are located in the bore and fluidly interconnect fitting 52 and nozzle 54. Fuel conduits 60, 61 are formed from a material appropriate for the particular application, for example Stainless Steel (e.g., SS347). Appropriate valves (not shown) are provided in the stem, in the fitting and/or upstream of the fitting to control the introduction of fuel into the conduits. Primary fuel conduit 60 has a hollow central passage 62 to direct fuel in a primary fuel flow; while secondary fuel conduit 61 concentrically surrounds primary conduit 60, and defines therewith an annular passage 63 to direct fuel in a secondary fuel flow. Preferably an annular air gap 67 (FIG. 3) is provided between the housing stem 56 and the outer fuel conduit 61 for thermal management.

As shown in FIG. 1, an annular flange 70 is formed in one piece with the housing stem 56 proximate the fitting 52, and extends radially outward therefrom. Flange 70 includes appropriate apertures to allow the flange to be easily and securely connected to, and disconnected from, the casing of the engine using, e.g., bolts or rivets. Flange 70 preferably has a flat lower surface which is disposed against a flat outer surface of the casing.

Figure 4:
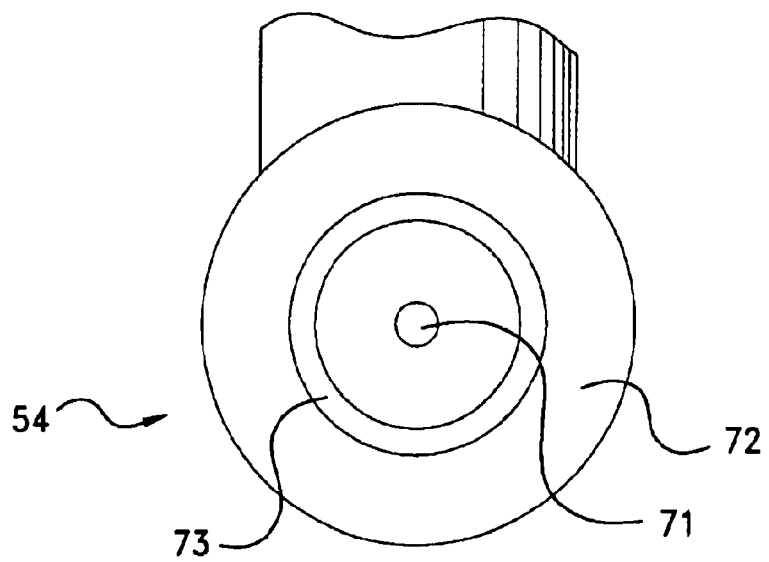
FIG. 4 is an end view of the nozzle for the fuel injector.

The nozzle 54 of the injector can be any nozzle appropriate for the particular application, and as shown in FIG. 4, generally includes a primary discharge orifice 71 centrally located in the discharge end 72 of the nozzle for receiving fuel from the primary fuel passage 62; and an annular secondary discharge orifice 73, surrounding the primary discharge orifice 71, for receiving fuel from the secondary fuel passage 63. Again, the nozzle structure can vary depending upon the particular application.

As indicated above, the primary fuel passage 62 provides fuel in a continuous flow during engine operation. In one application, the flow varied from about 43 pph at take-off, to about 32 pph at cruise, to about 20 pph at idle descent. Fuel in the secondary fuel passage 63 is non-continuous (i.e., it is substantially or completely suspended) or at least significantly reduced, during certain engine operations. In the one application for example, the flow varied from about 394 pph at take-off, to about 63 pph at cruise, to about 6 pph at idle descent. As should be appreciated, at idle descent, the low flow through the outer, secondary fuel passage is insufficient to properly conduct heat energy away from the outer walls of the secondary conduit, which can lead to extreme temperatures and coking in the fuel passage (at least without significant heat shielding efforts).

According to the present invention, a plurality of elongated fins as at 80 in FIG. 3, are provided integral, and preferably unitary with the inner fuel conduit 60 along the entire length of the conduit. The fins project radially outward from the wall defining the inner fuel conduit, and can be easily formed such as during the extrusion of the conduit. The fins define flutes, or discrete rounded passages, as at 82, for the fuel in the outer fuel passage. The fins are fixed at their radial outer ends to the wall defining the outer fuel conduit 61, and provide structural support and thermally connect the inner and outer fuel conduits.

During low power operation, when the flow is primarily or solely in the inner conduit 60 (that is, the flow is reduced or suspended in the outer conduit 61), the fins transfer and conduct heat energy between the outer conduit and the inner conduit to cool the outer conduit. The continuous flow of the primary fuel in the inner conduit removes heat energy from the inner conduit to thereby thermally protect and prevent coking of the fuel in the secondary fuel passage (outer fuel conduit).

The fins 80 fit closely in the outer conduit during assembly. After the inner conduit is inserted into the outer conduit, the outer conduit can be inwardly-formed (e.g., swaged or rolled). Alternatively (or in addition), the inner conduit can be outwardly-formed (e.g., ballized). In either case, the conduit(s) are formed until an appropriate braze gap is created between the fins and the outer conduit. The fins are then brazed to the outer conduit to create a rigid connection. The inner tube can be nickel plated to facilitate this process.

In the illustrated embodiment, six such fins (and flutes) are shown, identical in structure and evenly spaced about the circumference of the inner fuel conduit. Each fin has a longer length than width, although the fins have a sufficient width to conduct and transfer a sufficient amount of heat energy from the outer fuel conduit to the inner fuel conduit. It should be appreciated that while the above structure is preferred, it is only exemplary in nature, and the number and dimensions of the fins can vary, depending on the desired flow through the secondary fuel passage, and the heat transfer necessary between the outer fuel passage and the inner fuel passage. This can be easily determined by those of ordinary skill in the art using simple experimentation and/or modeling.

It has been determined that having such fluted tubes between the inner and outer conduits can decrease the wetted wall temperature of the outer, secondary fuel conduit significantly, and in one application, by as much as ninety-three degrees during idle descent conditions, as compared to concentric tubes, without such fins, under the same operating conditions. This reduction of wall temperature is believed sufficient to prevent coking of the fuel in the secondary fuel passage during operation of a gas turbine engine for aircraft under idle, descent conditions. The benefits of heat transfer and conduction are also obtained during take-off and cruise, although as should be appreciated, the need for such cooling is less important under these conditions, as the secondary flow is generally sufficient to prevent coking, but under extreme operating conditions, the conduction and transfer of heat away from the outer fuel conduit can be advantageous. But in any event, by using a relatively simple fin structure, which is relatively straightforward to manufacture and assemble, significant improvement in thermal management is obtained for the fuel injector.

The fuel injector of the present invention can be placed in an evenly-spaced annular arrangement to dispense (spray) fuel in a uniform manner into the combustor chamber, as is known. Additional concentric and/or series combustion chambers can be provided with nozzles that can be supported separately or on common stems. The fuel provided by the injectors is mixed with air and ignited, so that the expanding gases of combustion can move rapidly across and rotate turbine blades in a gas turbine engine to power an aircraft, or in other appropriate manners in other combustion applications.

Thus, the present invention provides a new and unique fuel injector, particularly for gas turbine applications in aircraft engines, which does not require bulky heatshielding and prevents, or at least reduces, coking in the injector. The present invention is particularly useful for applications where a secondary (non-continuous) fuel flow surrounds a primary (continuous) fuel flow through the injector.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A fuel injector for a gas turbine engine, including a fitting for receiving fuel, a nozzle for dispensing fuel, and a housing stem supporting and interconnecting the fitting and the nozzle, primary and secondary fuel passages internal to the stem fluidly interconnecting the fitting and the nozzle, with the primary fuel passage receiving a continuous supply of fuel during the entire operation of the engine, and the secondary fuel passage receiving a non-continuous or significantly reduced supply of fuel during at least a portion of the operation of the engine, the secondary fuel passage outwardly surrounding the primary fuel passage in concentric relation thereto, and a plurality of fins extending radially between and interconnecting an inner wall defining the primary fuel passage and an outer wall defining the outer fuel passage, the fins providing structural support and thermal management along the length of the housing stem.

2. The fuel injector as in claim 1, wherein the fins provide heat transfer and conduction between the outer wall and the inner wall sufficient to reduce the temperature of the outer wall during idle descent operation of the gas turbine engine.

3. The fuel injector as in claim 1, wherein the fins provide heat transfer and conduction between the outer wall and the inner wall sufficient to prevent coking along the length of the housing stem during idle descent operation of the gas turbine engine.

4. The fuel injector as in claim 1, wherein the fins define fluted passages along the length of the housing stem.

5. The fuel injector as in claim 1, wherein the housing stem comprises a heatshield externally surrounding the secondary fuel passage.

6. The fuel injector as in claim 1, wherein the nozzle includes a primary discharge orifice fluidly connected to the primary fuel passage and a secondary discharge orifice fluidly connected to the secondary fuel passage.

7. The fuel injector as in claim 1, wherein an inner primary fuel conduit defines the primary fuel passage, and an outer secondary fuel conduit, concentrically surrounding the inner fuel conduit, defines the secondary fuel passage, and the fins extend radially between and interconnect the inner primary and outer secondary fuel conduits.

8. The fuel injector as in claim 7, wherein the fins extend along the entire length of the inner primary and outer secondary fuel conduits.

9. The fuel injector as in claim 7, wherein the fins are unitary with the inner primary fuel conduit.

10. A fuel injector for a gas turbine engine, where the fuel injector includes primary and secondary concentric fuel conduits disposed within a housing stem, with the secondary fuel conduit outwardly surrounding the primary fuel conduit, and where flow through the secondary fuel conduit is generally insufficient during a portion of engine operation to absorb enough heat energy from an outer wall defining the secondary fuel conduit to prevent coking, the improvement comprising a plurality of radial fins extending between and interconnecting the inner and outer fuel conduits, the radial fins providing heat transfer between the outer, secondary fuel conduit and the inner, primary fuel conduit sufficient to prevent coking in the secondary fuel conduit during the portion of engine operation.

11. The fuel injector as in claim 10, wherein the fins provide heat transfer and conduction between the primary fuel conduit and the secondary fuel conduit sufficient to reduce the temperature of the secondary fuel conduit during the portion of engine operation.

12. The fuel injector as in claim 10, wherein the fins define fluted passages along the length of the housing stem.

13. The fuel injector as in claim 10, wherein the housing stem comprises a heatshield externally surrounding the secondary fuel conduit.

14. The fuel injector as in claim 10, wherein the fins extend along the entire length of the inner primary and outer secondary fuel conduits.

15. The fuel injector as in claim 10, wherein the fins are unitary with the inner primary fuel conduit.

* * * * *